United States Patent [19]
Slovich

[11] Patent Number: 5,536,295
[45] Date of Patent: Jul. 16, 1996

[54] ROBOTIC DEVICE FOR MOLTEN METAL PROCESSING

[75] Inventor: Charles M. Slovich, Cleveland, Ohio

[73] Assignee: Garfield Alloys, Inc., Garfield Heights, Ohio

[21] Appl. No.: 441,205

[22] Filed: May 15, 1995

[51] Int. Cl.$^6$ ................................................ C22B 26/00
[52] U.S. Cl. .............................. 75/604; 75/600; 266/239
[58] Field of Search ............................. 75/600, 601, 604, 75/594, 595; 266/235, 239

[56] References Cited

U.S. PATENT DOCUMENTS

| | | | |
|---|---|---|---|
| 1,952,145 | 3/1934 | Schmiller, Sr. | 266/235 |
| 2,472,757 | 6/1949 | Peake | 75/600 |
| 4,178,177 | 12/1979 | Roebuck et al. | 75/600 |
| 4,511,125 | 4/1985 | Hochstrasser et al. | 266/135 |
| 4,747,583 | 5/1988 | Gordon et al. | 266/235 |
| 5,294,245 | 3/1994 | Gilbert et al. | 266/235 |

*Primary Examiner*—Scott Kastler
*Attorney, Agent, or Firm*—Harrison & Egbert

[57] ABSTRACT

An apparatus for the processing of molten metal including a crucible furnace for receiving magnesium scrap and for converting the magnesium scrap into molten metal, a robotic arm positioned so as to extend into the molten metal in the crucible furnace and having a three-axis range of motion. The robotic arm has a connector formed thereon so as to receive a tool. The tool can be a pump which is connected to the robotic arm means so as to transfer the molten metal from the crucible furnace to another location. The pump includes a pump nozzle which is connected to the robotic arm and extends from the robotic arm into the molten metal, an outlet conduit fixedly positioned relative to the crucible furnace, and a pump connected to the pump nozzle and to the outlet conduit. A mixer member is attachable to the connector of the robotic arm to as to extend into the molten metal for the purpose of pushing the magnesium scrap into the molten metal. A skimmer member is attachable to the connector of the robotic arm so as to extend into the molten metal. The pump, the mixer, and the skimmer are detachable from and interchangable on the connector of the robotic arm.

8 Claims, 2 Drawing Sheets

ROBOTIC DEVICE FOR MOLTEN METAL PROCESSING

TECHNICAL FIELD

The present invention relates to the processing of molten metal. More particularly, the present invention relates to the mixing, puddling, skimming, and pumping of molten metal. More particularly, the present invention is related to the sand caste and die cast magnesium industry in the remelting of automotive scrap.

BACKGROUND ART

Each year, millions of tons of magnesium scrap are generated in the United States. Scrap magnesium metal can be recycled into reusable magnesium metal through a process of smelting and refining. Current disposal practice is to either landfill scrap metal or reclaim it through a melting process. The costs involved in the melting process necessitate the improvement of smelting techniques and efficiencies.

Magnesium, and its alloys, is the metal of choice in the automotive industry. Magnesium is two-thirds less dense than aluminum with equal strength characteristics. The use of magnesium in the automotive industry is expected to increase in the coming years. This increase will boost the demand for magnesium metal. It will also serve to Generate increasing amounts of magnesium scrap in the future.

Metal alloys generally contain constituents of different densities and different melting points. In the case of magnesium smelting, metal is derived from the melting and refining of magnesium scrap. Magnesium scrap is melted in crucible pot furnaces. Proper mixing of the melt, as well as skimming and pumping of the molten metal, is necessary for proper development of the metal product. These procedures have been performed by hand in the past.

Typically, during the melting of scrap magnesium by smelters and die casters, mixing takes place through either convective action or by furnace rotation. Mixing is needed to prevent magnesium, alloy, and material stratification. The prior art is devoid of mechanical mixing arms or implements for the purposes of processing the molten metal.

U.S. Pat. No. 4,178,177, issued on Dec. 11, 1979, to Roebuck et al. describes a stirring mechanism for making magnesium alloys. This patent describes a loop-shaped paddle which rotates about an axis which itself rotates orbitally about a fixed axis. This loop-shaped paddle is designed to stir fluid masses including a molten metal, such as magnesium alloys. The loop is shaped so that it passes close to substantially the whole bottom of the vessel.

It is an object of the present invention to provide an apparatus and method for mixing (puddling), skimming and pumping of molten metal.

It is another object of the present invention to provide an apparatus and method where such actions can be carried out interchangeably with a single robotic arm.

It is a further object of the present invention to provide an apparatus and method which effectively causes molten scrap to be pushed under the surface of the molten metal.

It is still a further object of the present invention to increase the yield of magnesium in the smelting process by providing more efficient mixing of the melt.

It is still a further object of the present invention to provide a method and apparatus for molten metal processing which is easy to operate, easy to use, and cost-effective.

These and other objects and advantages of the present invention will become apparent from a reading of the attached specification and appended claims.

SUMMARY OF THE INVENTION

The present invention is an apparatus and method for the processing of molten metal. The apparatus of the present invention includes a crucible furnace for receiving magnesium scrap and for converting the magnesium scrap into a molten metal. A robotic arm is positioned so as to extend into the molten metal in the crucible furnace. This robotic arm has a three-axis range of motion. A pump is connected to the robotic arm so as to transfer the molten metal from the crucible furnace to another location. The pump includes a pump nozzle which is connected to the robotic arm and extends into the molten metal, an outlet conduit fixably positioned relative to the crucible furnace and extending as an inlet to a holding furnace, and a pump connected to the pump nozzle and to the outlet conduit.

A mixer can be attached to the robotic arm so as to extend into the molten metal. This mixer serves to push magnesium scrap into the molten metal. The mixer is interchangeable with the pump nozzle on the robotic arm. The mixer includes a puddler member having a generally flat bottom surface, an arm extending upwardly transverse to this flat bottom surface, and a lock pin affixed to an end of the arm opposite the puddler member. The lock pin serves to detach to the connector of the robotic arm. The puddler member has a Generally circular configuration with a plurality of holes extending therethrough. These holes open to the flat bottom surface of the puddler member.

A skimmer can be attached to the connector of the robotic arm so as to extend into the molten metal. The skimmer serves to scrape films from an interior surface of the crucible furnace and deposit such films to a location exterior of the crucible furnace. The skimmer includes a scraper member having a generally sharp forward edge and a generally flat bottom surface. An arm extends upwardly transverse to the generally flat bottom surface of the scraper member. A lock pin is affixed to an end of the arm opposite the scraper member. This lock pin is suitable for detachable engagement with the connector of the robotic arm.

The present invention is also a method for processing molten metal which comprises the steps of: (1) transferring magnesium scrap into a crucible furnace; (2) melting the magnesium scrap into molten metal; (3) mixing the magnesium scrap with the molten metal in the crucible furnace; (4) scraping films from an interior surface of the crucible furnace; and (5) pumping the molten metal from the crucible furnace. The method of mixing includes the step of attaching a puddler member to an end of a robotic arm and moving the robotic arm and the puddler member through three axes of motion in the crucible furnace. The magnesium scrap is pushed under a surface of the molten metal. Additionally, non-metallic inclusions are contacted with refining agents in the molten metal.

The step of scraping includes the steps of attaching a scraper member to an end of the robotic arm and moving the robotic arm and the scraper member through three axes of motion in the crucible furnace such that the scraper member moves along an interior surface of the crucible furnace. This step of scraping includes scooping magnesium dross from the crucible furnace and depositing the magnesium dross to another location.

The step of pumping includes attaching a pump to an end of the robotic arm and moving the robotic arm vertically within the crucible furnace such that an end of the pump receives the molten metal and transfers the molten metal to a holding furnace.

DETAILED DESCRIPTION OF THE INVENTION

Figure 1:
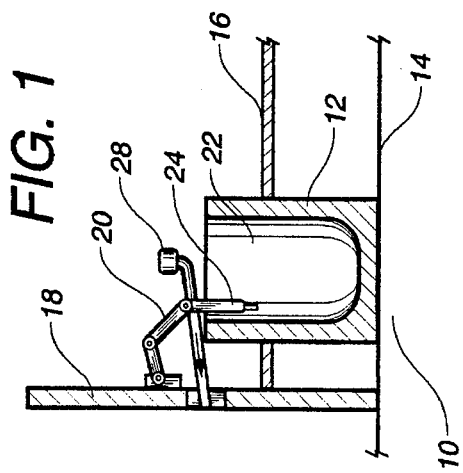
FIG. 1 is a diagrammatic illustration of the process of the present invention.

Referring to FIG. 1, there is shown at 10 the apparatus and method in accordance with the preferred embodiment of the present invention. In particular, in FIG. 1, it can be seen that the apparatus of the present invention includes a crucible furnace 12 that is supported upon a common floor 14. An access floor 16 extends around an upper part of the crucible furnace 12. A wall 18 is mounted upon the common floor 14 for support of robotic arm 20. The robotic arm 20 extends toward the interior 22 of the crucible furnace 12. The robotic arm 20 has a three-axis range of motion. A connector 24 is formed at an end of the robotic arm 20 so as to detachably receive a tool thereon.

The crucible furnace 12 serves to receive magnesium scrap from a crusher by way of a charger conveyor (not shown). Heat is applied to the crucible furnace so as to convert the magnesium scrap into a molten metal. The molten metal is contained within the interior 22 of the crucible furnace 12 such that the connector 24 of the robotic arm 20 extends into the molten metal. The processing of the molten metal within the interior 22 of the crucible furnace 12 is carried out by the attachment of a particular tool to the connector 24. The tools can include a pump, mixer/puddler, or a scraper/skimmer. An outlet conduit 26 is positioned in fixed relationship to the crucible furnace 12. The transfer connector 28 of the outlet conduit 26 is suitable for receiving a pump connection therein (to be described hereinafter). The outlet conduit 26 extends through wall 18 to a holding furnace. The outlet conduit 26 serves as an inlet to a holding furnace (external of the process).

The present invention 10 provides an apparatus and method for the mixing, skimming and pumping of molten metal by using a robotic arm 20 in combination with special tools affixed to the connector 24. These tools allow these operations to be performed in an exact manner without the need for any manual operation. The robotic arm 20 is capable of motion in the x, y and z axes so as to allow for the mixing, skimming and pumping of the molten metal by using a single robotic device 20.

Figure 2:
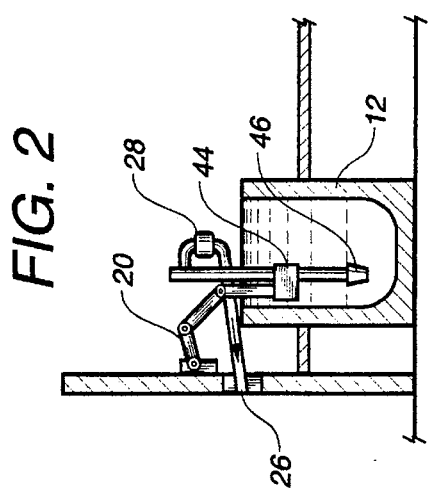
FIG. 2 is an isolated view of the robotic arm with the pump attached thereto.

FIG. 2 shows the operation of the robotic arm 20 when a pump 44 is affixed to the connector 24 of the robotic arm 20. The pump 44 includes a pump nozzle 46 which extends so as to be affixed to connector 28 and to outlet conduit 26. The pump 44 and the pump nozzle 46 are presently commerically available items. The pump nozzle 46 extends downwardly into the molten metal within the crucible furnace 12. In the configuration shown in FIG. 2, the nozzle 46 and the pump 44 will have vertical motion within the crucible furnace 12. As such, the end of the nozzle 46 will be in an appropriate position to allow the molten metal to be pumped therethrough. The pump 44 is affixed to the connector 24 of the robotic arm. 20 with a lock pin.

Figure 4:
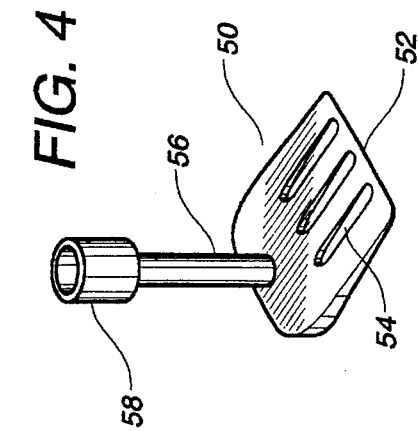
FIG. 4 is an isolated perspective view of the scraper/skimmer of the present invention.
Figure 3:
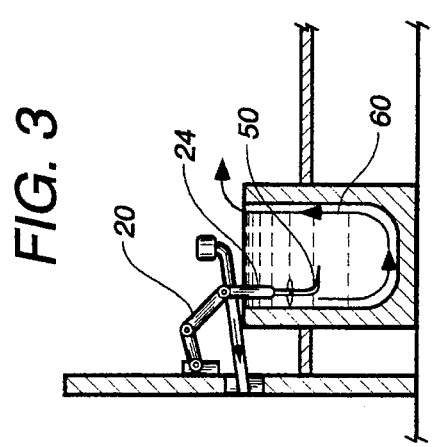
FIG. 3 is an isolated view of the robotic arm with the scraper/skimmer attached thereto.

FIG. 3 shows the robotic arm 20 as having a scraper/skimmer 50 affixed to the connector 24. FIG. 4 is an isolated view of an embodiment of the scraper/skimmer 50. With reference to FIG. 4, it can be seen that the scraper/skimmer 50 has a generally sharp forward edge 52 and a generally flat bottom surface 54. An arm 56 extends upwardly from the scraper 50. A lock pin 58 is provided at the end of the arm 56 opposite the scraper 50 so as to allow the scraper 50 to be affixed to the connector 24 of the robotic arm 20.

With reference to FIG. 3, it can be seen by the arrow 60 that the scraper/skimmer 50 can be moved, along with the robotic arm 20 through three axes of motion in the crucible furnace 12. This movement causes the scraper/skimmer 50 to move along an interior surface of the crucible 12. The robotic arm 20 and the scraper/skimmer 50 serve to skim the fluxing agents and impurities located at the bottom of the crucible furnace 12. Surface oxide films and other inclusions are removed in the liquid state by the action of the flux. These inclusions and flux settle to the bottom of the crucible 12 by the action of gravity and are physically removed by the scraper/skimmer 50 and the robotic arm 20. The by-product of this process is known as dross. The robotic arm 20 with the scraper/skimmer 50 automatically scoops the dross and deposits it into a special container exterior of the crucible furnace 12.

Figure 6:
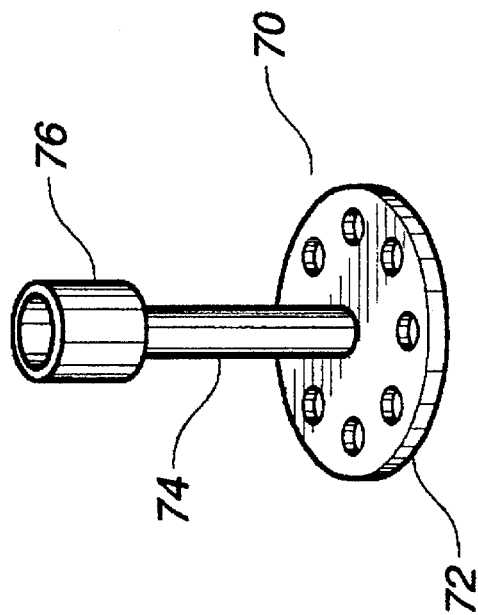
FIG. 6 is an isolated perspective view of the mixer/puddler.
Figure 5:
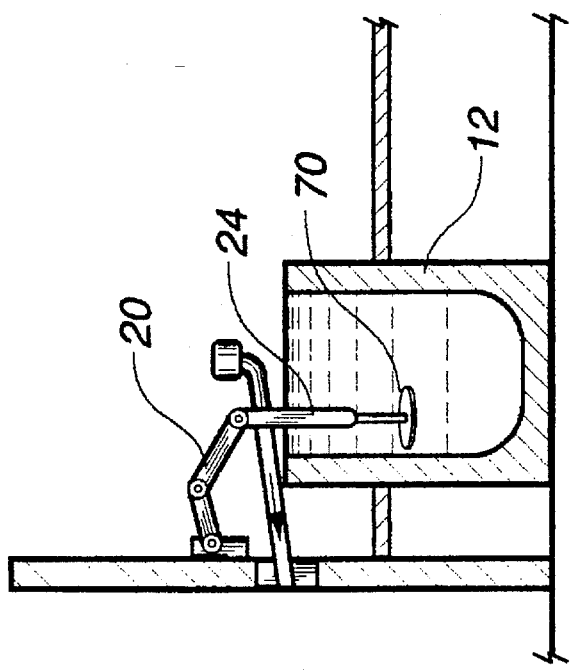
FIG. 5 is an isolated illustration of the mixer/puddler as attached to the robotic arm.

FIG. 5 illustrates the robotic arm 20 as having a mixer/puddler 70 attached thereto. FIG. 6 illustrates the mixer/puddler 70 in greater detail. As can be seen in FIG. 6, the mixer/puddler 70 includes a puddler member 72 of a generally circular configuration. The puddler member 72 has a generally flat bottom surface and a plurality of holes extending therethrough. These holes open to the flat bottom surface of the puddler member 72. An arm 74 extends transversely upwardly from the puddler member 72. A lock pin 76 is supported at the end of arm 74 opposite the puddler member 72. The lock pin 76 can be affixed to the connector 24 at the end of the robotic arm 20. The robotic arm 20 and the mixer/puddler 70 are used so as to mix the molten metal within the interior of the crucible furnace 12. Mixing is required to provide intimate contact of the refining agents and the non-metallic inclusions that are trapped in the molten metal. The mixing serves to improve heat distribution. In addition, the robotic arm 20 with the mixer/puddler 70 is used to push scrap metal under the surface of the molten metal. The mixing action used in the secondary smelting of dross turns over the dross (scrap magnesium) so as to release magnesium alloy metal trapped in the dross skim phase located at the bottom of the crucible. In combination with the robotic arm 20, the mixer/puddler 70 is moved through three axes of motion. The puddler 70 can access any point within the interior of the crucible 12.

In the method of the present invention, the magnesium scrap is transferred into the crucible furnace 12. When the magnesium scrap is placed into the crucible furnace 12, the magnesium scrap is melted into a molten metal. The magnesium scrap is then mixed with the molten metal in the crucible furnace through the use of the robotic arm 20 and the mixer/puddler 70. The scraper/skimmer 50 is then used so as to scrape films from an interior surface of the crucible furnace 12 and to deposit such scrapings exterior of the crucible furnace. The molten metal is then pumped, by pump 44, from the crucible furnace 12 and transferred through outlet conduit 26 to the holding furnace.

Additionally, the method of the present invention further includes the steps of attaching the mixer/puddler 70 to the connector 24 of the robotic arm 20. The robotic arm 20 and the mixer/puddler 70 are moved through three axes of motion in the crucible furnace. This motion serves to push the magnesium scrap under a surface of the molten metal. Additionally, this step of mixing also includes the contacting of non-metallic inclusions with refining agents in the molten metal.

The method of the present invention further includes the steps of attaching the scraper/skimmer 50 to the connector 24 of robotic arm 20. The robotic arm 20 and the scraper/skimmer 50 are then moved through three axes of motion in the crucible furnace 12 such that the scraper/skimmer 50 moves along an interior surface of the crucible furnace 12. This step of scraping includes scooping the magnesium dross from the crucible furnace 12 and depositing this magnesium dross exterior of the crucible furnace 12. Additionally, this step includes the skimming of fluxing agents and impurities at the bottom of the crucible furnace.

The method of the present invention further includes the steps of attaching a pump 44 to an end of the robotic arm 20 and moving the robotic arm 20 and the pump within the crucible furnace such that the nozzle end 46 of the pump 44 receives the molten metal so as to transfer the molten metal to the holding furnace.

The foregoing disclosure and description of the invention is illustrative and explanatory thereof. Various changes in the details of the illustrated construction or the described method can be made within the scope of the appended claims without departing from the true spirit of the invention. The present invention should only be limited by the following claims and their legal equivalents.

I claim:

1. A method for processing molten metal comprising the steps of:

transferring magnesium scrap into a crucible furnace;

melting the magnesium scrap into molten metal in the crucible furnace;

mixing the magnesium scrap with the molten metal in the crucible furnace said step of mixing comprising:

attaching a puddler member to a connector of a robotic arm, said robotic arm positioned exterior of said crucible furnace; and moving the robotic arm and the puddler member through three axes of motion in the crucible furnace;

scraping films from an interior surface of the crucible furnace; and pumping the molten metal from the crucible furnace.

2. The method of claim 1, said step of mixing comprising:

attaching a puddler member to a connector of a robotic arm, said robotic arm positioned exterior of said crucible furnace; and moving the robotic arm and the puddler member through three axes of motion in the crucible furnace.

3. The method of claim 1, said step of mixing further comprising the step of:

pushing the magnesium scrap under a surface of the molten metal.

4. The method of claim 1, said step of mixing further comprising:

contacting non-metallic inclusions with refining agents in the molten metal.

5. A method for processing molten metal comprising the steps of:

transferring magnesium scrap into a crucible furnace;

melting the magnesium scrap into molten metal in the crucible furnace;

mixing the magnesium scrap with the molten metal in the crucible furnace;

scraping films from an interior surface of the crucible furnace, said step of scraping comprising:

attaching a scraper member to a connector of a robotic arm, said robotic arm having a portion positioned exterior of said crucible furnace; and moving the robotic arm and the scraper member through three axes of motion in the crucible furnace such that said scraper member moves along an interior surface of the crucible furnace; and pumping the molten metal from the crucible furnace.

6. The method of claim 5, said step of scraping further comprising the steps of:

scooping magnesium dross from the crucible furnace; and depositing the magnesium dross exterior of the crucible furnace.

7. The method of claim 5, said step of scraping further comprising the step of:

skimming fluxing agents and impurities at a bottom of the crucible furnace.

8. A method for processing molten metal comprising the steps of:

transferring magnesium scrap into a crucible furnace;

melting the magnesium scrap into molten metal in the crucible furnace;

mixing the magnesium scrap with the molten metal in the crucible furnace;

scraping films from an interior surface of the crucible furnace; and pumping the molten metal from the crucible furnace, said step of pumping comprising the steps of:

attaching a pump to a connector of a robotic arm, said robotic arm having a portion positioned exterior of said crucible furnace; and moving the robotic arm vertically within the crucible furnace such that an end of the pump receives the molten metal.

* * * * *